April 15, 1958   J. J. KOWALIK   2,830,719
POWER LOADER FRAME STRUCTURE WITH PARKING LEG
Filed Oct. 24, 1955
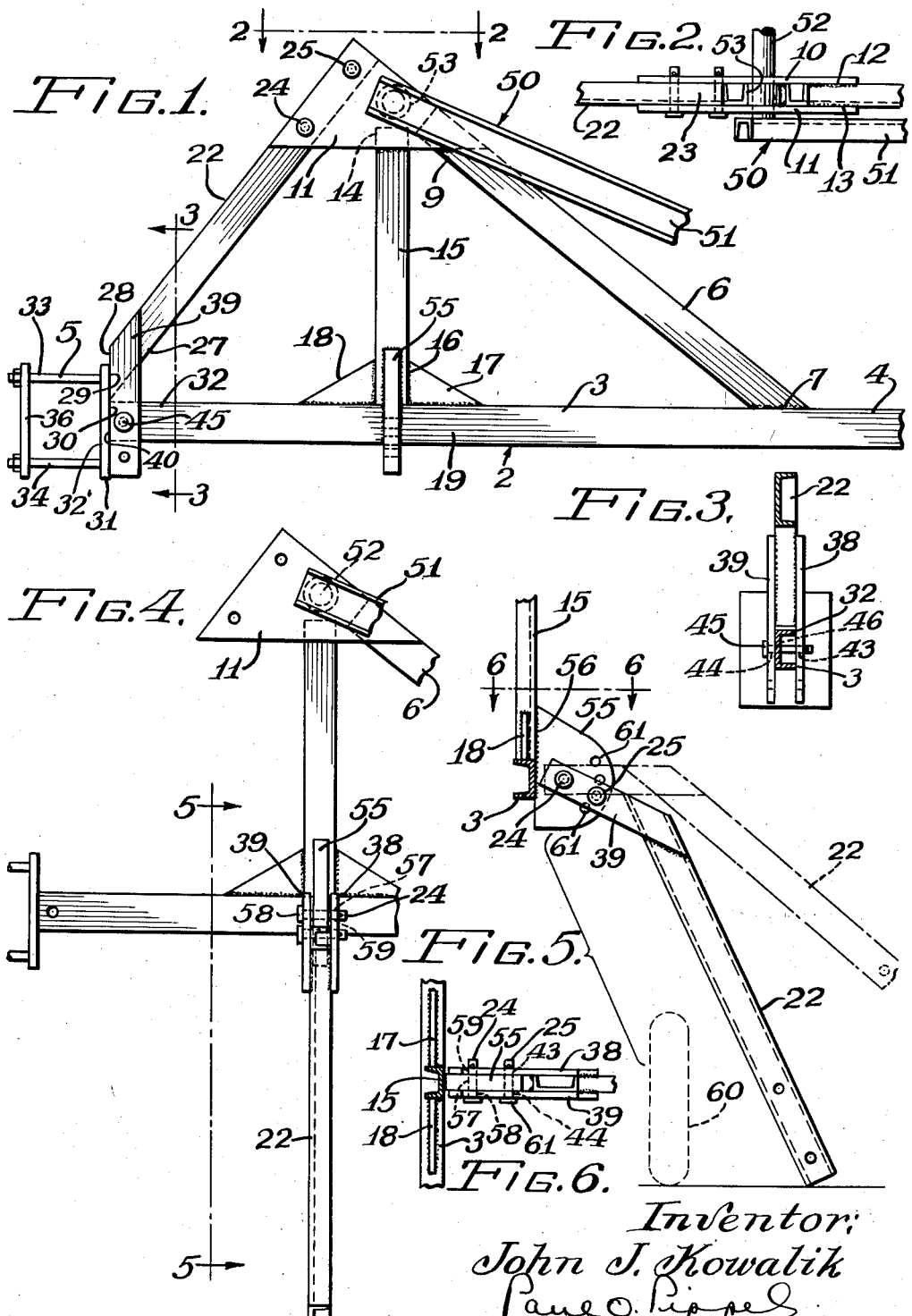
Inventor:
John J. Kowalik
Paul O. Pippel
Atty.

United States Patent Office 2,830,719
Patented Apr. 15, 1958

2,830,719

POWER LOADER FRAME STRUCTURE WITH PARKING LEG

John J. Kowalik, Chicago, Ill., assignor to International Harvester Company, a corporation of New Jersey Application October 24, 1955, Serial No. 542,350

11 Claims. (Cl. 214—130)

This invention relates to power loaders and more specifically to a novel support frame structure therefor.

A general object of the invention is to provide a novel frame structure for the support of power loaders from associated vehicles, the structure incorporating various frame members which are formed and arranged to sustain the heavy operating loads and wherein one of the members is movable to a position to serve as a parking support for the loader when not in use so that it may be easily assembled or disassembled with respect to an associated tractor.

A more specific object of the invention is to design such a frame member which cooperates with the remaining members of the frame structure in sustaining operating loads and is so positioned that it may be removed from the frame structure without its collapsing so that the remaining frame structure is sufficient to support the static weight of the loader mechanism and the frame member being positionable to sustain the frame structure and loader in parking position.

These and other objects of the invention become more apparent from the specification and the drawings wherein:

Figure 1 is a fragmentary side elevational view of a power loader frame structure incorporating the invention and showing the parts disposed in operating position;

Figure 2 is a fragmentary plan view taken substantially on the line 2—2 of Figure 1;

Figure 3 is a vertical cross-sectional view taken substantially on the line 3—3 of Figure 1;

Figure 4 is a fragmentary side elevational view illustrating the parking position of the structure;

Figure 5 is a cross-sectional view taken substantially on the line 5—5 of Figure 4; and Figure 6 is a horizontal sectional view taken substantially on the line 6—6 of Figure 5.

This invention is shown in application to a power loader of the type disclosed in U. S. Patent 2,603,374 and comprises a support structure generally indicated 2 which is in the form of a side frame, there being two such frames which are disposed at opposite sides of the tractor as well-known in the art and as best shown in the aforementioned patent. The side frame, chosen for purposes of illustration only, comprises a longitudinal fore and aft extending frame member 3 which is adapted for connection to the side of a tractor at its forward end portion 4 as best described in the patent, and at its rear end has means 5 for connection to the rear cross axle of the tractor. The side frame 2 comprises an upwardly and rearwardly diagonally extending forward frame member 6 which is connected, as by welding, at 7 to the forward portion 4 of the frame member 3 which extends generally horizontally, the frame member 6 being embraced at its upward rearward extremity 9 by a pair of triangular gusset plates 10 and 11 which are weld connected thereto as at 12 and 13 (Fig. 2). The gusset plates 10 and 11 also embrace the upper portion 14 of an upright column member 15 which at its lower end 16 is connected as by gusset members 17 and 18 to an intermediate portion 19 of the bottom frame member 3, the gusset plates being weld connected to the members 3 and 15. The frame structure 2 also comprises a rear member 22 which extends diagonally downwardly from the gusset plates 10 and 11 and has its upper portion 23 entered therebetween and removably connected thereto as by the plurality of pins 24 and 25. The member 22 has its lower rear end portion 27 sheared diagonally to provide a substantially vertical abutment area 28 which is adapted to seat as at 29 against the forward side 30 of the vertical base plate 31 which is weld connected to the rear extremity 32 of the base frame member 3 and is adapted with its rear side 32' to seat against a forward side of the associated rear axle, the member 31 forming part of the connecting means 5 which, in the present instance, is shown as having a plurality of upper and lower bolts 33 and 34 which at their forward ends are connected to the plate 31 and adapted to overlie and underlie the associated rear axle of the tractor and the rear extremities passing through a spanner plate 36 which is adapted to seat against the rear side of the associated axle and to be drawn up thereagainst by the nuts on the bolts 33 and 34.

The rear lower extremity 27 of the rear beam member 22 is provided with a pair of depending inboard and outboard connectors in the form of extender plates 38 and 39 which are weld connected thereto. The plates 38 and 39 receive the rear end portion 32 of the bottom beam member 3 therebetween and are provided with vertical rear edges 40 which seat against the forward side 30 of the mounting or fastening plate 31. The extender plates 38 and 39 are provided with aligned openings 43 and 44 (Fig. 3) which receive a pin 45 therethrough which also passes through an opening 46 in the end portion 32 of the beam 3. Thus the lower rear end of the member 22 is removably connected to the beam member 3.

It will be seen from a consideration of Figures 1, 2 and 4 that the gusset members 10 and 11 pivotally support the loader frame structure generally indicated 50 which follows the usual construction of having a pair of beam or boom members 51 on each side interconnected at their upward rear ends by a cross member 52 which may be in the form of a bar or a pipe and which is pivotal in a suitable bearing structure 53 between and connected with the members 10 and 11.

Thus it will be seen from a consideration of Figures 1, 2 and 3 that all of the beam members are cooperatively arranged in load suspending relationship to the loader structure 50 when the same is adapted for operation.

Referring now to Figures 4 to 6, which illustrate the parking position of the structure whereas Figures 1 to 3 illustrate the operating position of the structure, the said Figures 4 to 6 illustrate the rear beam member 22 as positioned from its first position to a second position whereat the pins 24, 25 and 45 are removed and the beam member 22 is lifted upwardly and disposed in depending relation to the frame structure 2. In this second position of the beam member 22 the connector plates 38 and 39 embrace a quadrant structure 55 which is connected, as by welding, to the lower portion 16 of the leg 15 and the outboard side of the intermediate portion 19 of the beam member 3, as at 56. The quadrant structure 55 projects outwardly of the frame structure 2 and is provided with a substantially horizontal pivot opening 57 which receives the pin 24 therethrough, said pin 24 extending through openings 58 and 59 provided in the members or plates 38 and 39. The pin 24 in this position affords a generally horizontal axis of pivot for the member 22 which slopes diagonally downwardly and outwardly, as best seen in Figure 5, from the plates 38 and 39, which extend outwardly of the frame 2 and thus positioning the leg 22 outwardly of the adjacent forward tractor wheel as shown at 60 in phantom lines in Figure 5, that is when the loader is used with a tractor of the four-wheel type wherein the front wheels are laterally separated. It will be seen that the leg 22 is swingable about a horizontal axis to various positions, as best seen in Figure 5, in order to adjust to different heights of tractor mountings and that the quadrant 55 is provided with a series of holes 61 about the center of the opening 57 for receiving the pin 25 which is adapted to extend through the openings 43 and 44 which previously had received the pin 45 in connecting the member 22 to the member 3. It will be understood that the pin 45 may be inserted in the opening 46 so that it would not be lost while the tractor is in parking position.

It will be seen that in the parking position the legs 6 and 15, together with the member 3, are sufficient to sustain the static weight of the loader structure 50, therefore the removal of the brace member 22, which should be essential for structural strength of the support 2 in the operating positioning of the loader, is readily available for removal when the loader is not being used and theerfore is adaptable for positioning in the second or parking position.

It will be understood that any of the other members, for example 6 or 15, may be suitably arranged to be swingable or movable to parking positions and that such constructions would be just merely variations of the instant invention.

The column 15 is weld connected at its upper portion 14 to the members 10 and 11 which with members 22 and 6 provide a fulcrum for the loader mechanism 50.

In order to disconnect the loader unit from a tractor upon which the unit is mounted with the side frames connected to the side of the tractor at 4 and at 5, the operator removes the leg 22 as shown in Figure 1 and disposes it as in Figure 4. Then he removes the connections at 4 and 5 from the tractor so that the loader is supported entirely from the legs 22 at each side of the tractor. Then the operator merely backs the tractor out from the loader unit. The dismounted unit is thus positioned at a height for ready assembly with the tractor by simply driving the tractor under the unit and attaching the beams 3 to the rear axle of the tractor at 5 and to the sides of the tractor at 4 whereupon the legs 22 are removed from the position shown in Figures 4–6 and disposed as shown in Figures 1–3.

What is claimed is:

1. In a power loader unit of the type adapted for mounting on a tractor and having a pair of laterally spaced side frames and each frame including a bottom member and a pair of removably interconnected upwardly converging elements carried upon said bottom member and collectively providing a fulcrum for an associated loader structure during operation thereof, first means removably connecting at least one of said elements with said bottom member, said one element being removable and adapted to be positioned in depending relation to the bottom member of the associated side frame for parking the unit, and second means connecting said one element with said bottom member.

2. The invention according to claim 1 and said second means connecting said bottom member and said one element comprising pivot means swingably supporting the one element on a fore and aft axis and said one element having a length greater than the height at which the bottom member is supported upon conventional tractors so that it has one end upon the ground and the other end supporting the frame while the unit is mounted upon the tractor.

3. The invention according to claim 1 and said one element described in its operating position connected to the other said element comprising a first portion extending diagonally between said bottom member and said other element, and having a second substantially vertical bifurcated portion connected to the adjacent end of the first portion and straddling said bottom member, said one element in the parking position thereof having said second portion extending outwardly of said frame and pivoted on said second means and said first portion extending diagonally downwardly and outwardly from said first portion.

4. In a loader unit of the type adapted for mounting and dismounting with respect to a tractor and comprising a side frame at each side thereof, each frame having a plurality of members cooperatively interconnected in collective maximum load sustaining relation, loader means having arm members swingably carried on the side frames, said frames adapted to removable attachment to the tractor, at least one of said members of each side frame disconnectible from the others thereof and positionable and connectible in supporting relation to another of the mentioned members while the remaining structure of the side frame is secured to the tractor, the members of each side frame remaining after removal of said one member thereof interconnected in mutual load-sustaining relation with each other less than said maximum to support the static weight of said loader means to permit detachment or attachment of said side frame structures with respect to the tractor.

5. A frame structure for a power loader comprising a bottom elongated tension member, a plurality of compression elements mounted upon said bottom member and arranged in upwardly converging relationship, an upright column element interconnecting said tension member with said compression elements, means interconnecting the upper ends of said elements and providing a fulcrum for an associated loader structure, means releasably interconnecting one of said elements with the others thereof and said member, said one element removable from said structure to a position supporting the frame from the ground while the other of said elements and member support the static load of said loader structure.

6. A frame for use in a power loader unit of the type attachable to the side of an associated tractor, said frame having a plurality of members mutually integrated to and forming a truss collectively support an associated loader structure, at least one of said members of the truss being separable from the others and positionable in supporting relationship thereto from the ground and the remainder of said members interconnected in mutually cooperative load-sustaining relationship to support said loader structure under static load.

7. In a power loader unit of the type adapted for mounting upon a tractor and having a pair of laterally spaced side frames, and each frame including a plurality of interconnected upwardly converging frame members removably attachable to the tractor and collectively providing a fulcrum for boom members of an associated loader during operation thereof, first means removably connecting one of said frame members to the others thereof, said one member being removable and adapted to be positioned in supporting relation to another of said members at that side of the unit for supporting that side frame and boom member off the ground to hold the unit in an elevated position when detached from the tractor, and second means removably connecting said one member with said other member.

8. In a power loader unit of the type adapted for mounting upon a tractor and having a pair of laterally spaced side frames, each frame including a fore and aft extending bottom member and a pair of front and rear upwardly converging beam elements connected respectively at their remote ends to said bottom member and having proximate ends spaced upwardly from said bottom member, means removably interconnecting said elements in one position at their proximate ends, a loader operatively mounted upon said frames via said means, said one element of each frame adapted to be removed and disposed in a second position outwardly the associate frame, and means for releasably connecting said one element at one end to the bottom member of the related frame while the other end rests upon the ground.

9. The invention according to claim 8 and further characterized in that said last-mentioned means comprises a pivotal connection on a fore and aft axis for permitting swinging movement of said one element toward and away with respect to the related frame transversely thereof while resting upon the ground for positioning the associated frame at various levels.

10. The invention according to claim 8 and further characterized in that said one element includes a pair of angularly arranged first and second portions which in the one position of said one element extend respectively diagonally and vertically, and in the second position said first portion extends diagonally downwardly and outwardly from said second portion, and said second portion extends transversely outwardly from the associated bottom member.

11. The invention according to claim 10 and said means for connecting said one element to said bottom member comprising a projection extending outwardly from the bottom member, and said second portion of the one element pivoted to the projection on an axis permitting vertical swinging movement of said one element, and means releasably connecting said one element at said second portion thereof to said ears in a plurality of positions about said axis.

References Cited in the file of this patent

UNITED STATES PATENTS

| | | |
|---|---|---|
| 2,417,560 | McNamara | Mar. 18, 1947 |
| 2,707,907 | Lindeman | May 10, 1955 |
| 2,738,083 | Cadwell | Mar. 13, 1956 |
| 2,745,564 | Billenstein | May 15, 1956 |